United States Patent [19]

Earing

[11] 3,747,037

[45] July 17, 1973

[54] PETROLEUM BASED OIL MODIFIED CASTOR OIL-URETHANE COMPOSITION FOR ELECTRICAL POTTING

[75] Inventor: Mason H. Earing, Danville, Ill.

[73] Assignee: General Electric Company, Ft. Wayne, Ind.

[22] Filed: Nov. 15, 1971

[21] Appl. No.: 198,811

Related U.S. Application Data

[63] Continuation-in-part of Ser. No. 77,678, Oct. 2, 1970, abandoned, which is a continuation of Ser. No. 697,180, Jan. 11, 1968, abandoned.

[52] U.S. Cl........ 336/96, 260/18 TN, 260/33.6 UB, 260/37 N, 264/272
[51] Int. Cl............................................. C08g 22/08
[58] Field of Search.......... 260/18 TN, 28, 33.6 UB, 260/37 N; 264/272; 336/96

[56] References Cited
UNITED STATES PATENTS

| 3,390,119 | 6/1968 | Alexander...................... 260/18 TN |
| 3,338,861 | 8/1967 | Mastin............................... 260/37 N |
| 3,136,732 | 6/1964 | Kaestner....................... 260/77.5 AB |

OTHER PUBLICATIONS

Plasticizer Technology, Vol 1; Bruins; Reinhold; N.Y. 1965, Page 80.

"Poly B–D Liquid Resins," Product Data Bulletin No. 505; issued May 1, 1965; Sinclair Petrochemicals Inc.; pages 1 to 3 of Table of Contents, pages 1, 3, 6 to 10, 13, 14, 15 to 17, 31, 35 to 38, 38a and 43 to 46.

Polyurethanes Chemistry and Technology, Part II; Saunders et al.; Interscience; N.Y. 1964; pages 778–781, 793–803.

Primary Examiner—M. J. Welsh
Assistant Examiner—C. Warren Ivy
Attorney—Radford M. Reams et al.

[57] ABSTRACT

A urethane composition potting compound having improved vibration damping properties and rheologically controlled characteristics is obtained by means of an extender oil which is a petroleum oil of high aromaticity to lower the cost of the product and improve the physical and functional properties of the potting material; the extender oil has a viscosity gravity constant greater than 0.95 and comprises greater than 55 percent by weight of the composition.

Prior to polymerization the oil extended isocyanate prepolymer and polyol is blended with silica so that the composition as a whole exhibits a quite unexpected combination of properties which make the product especially adapted for potting electrical components.

4 Claims, 5 Drawing Figures

INVENTOR
MASON H. EARING

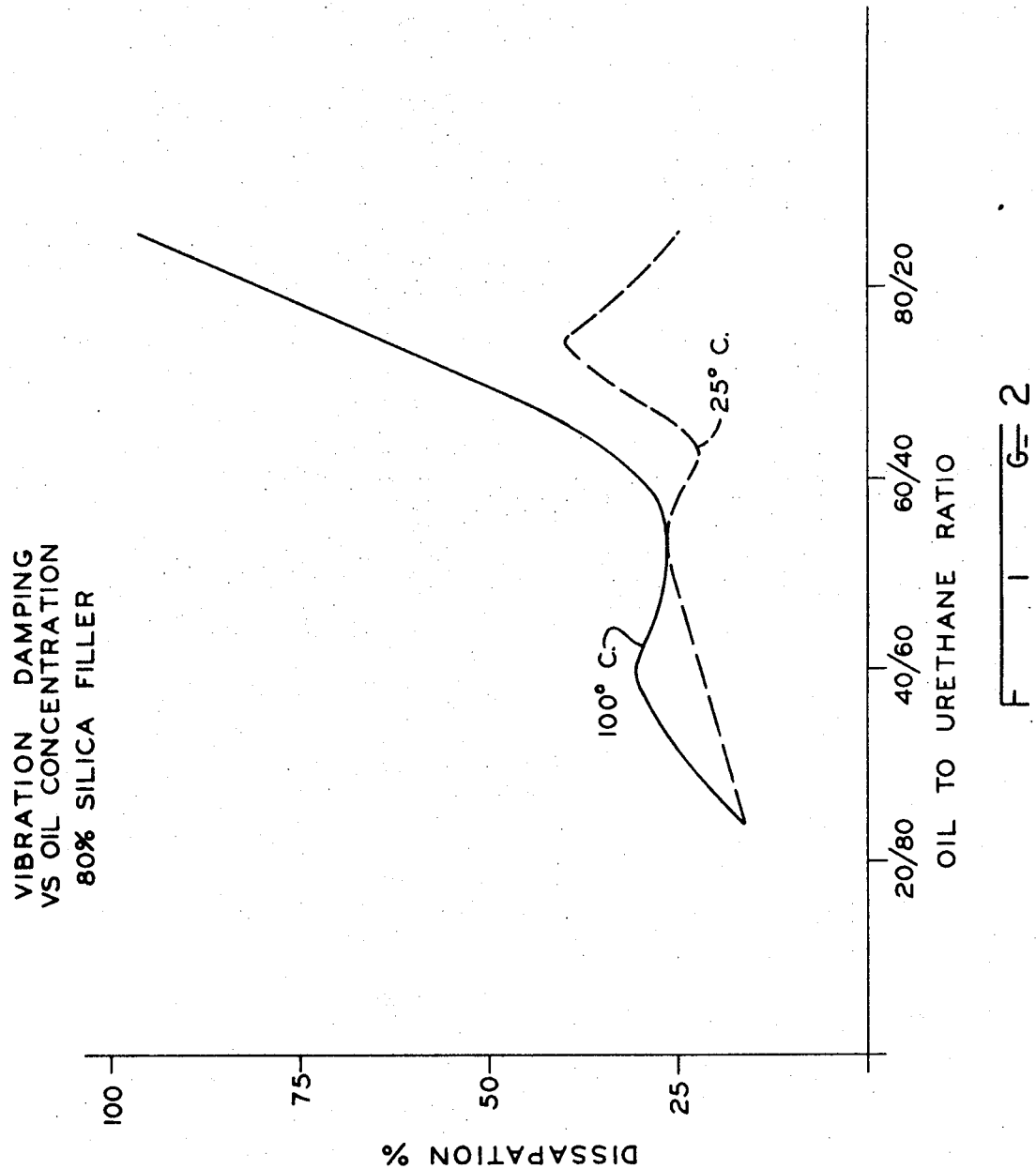

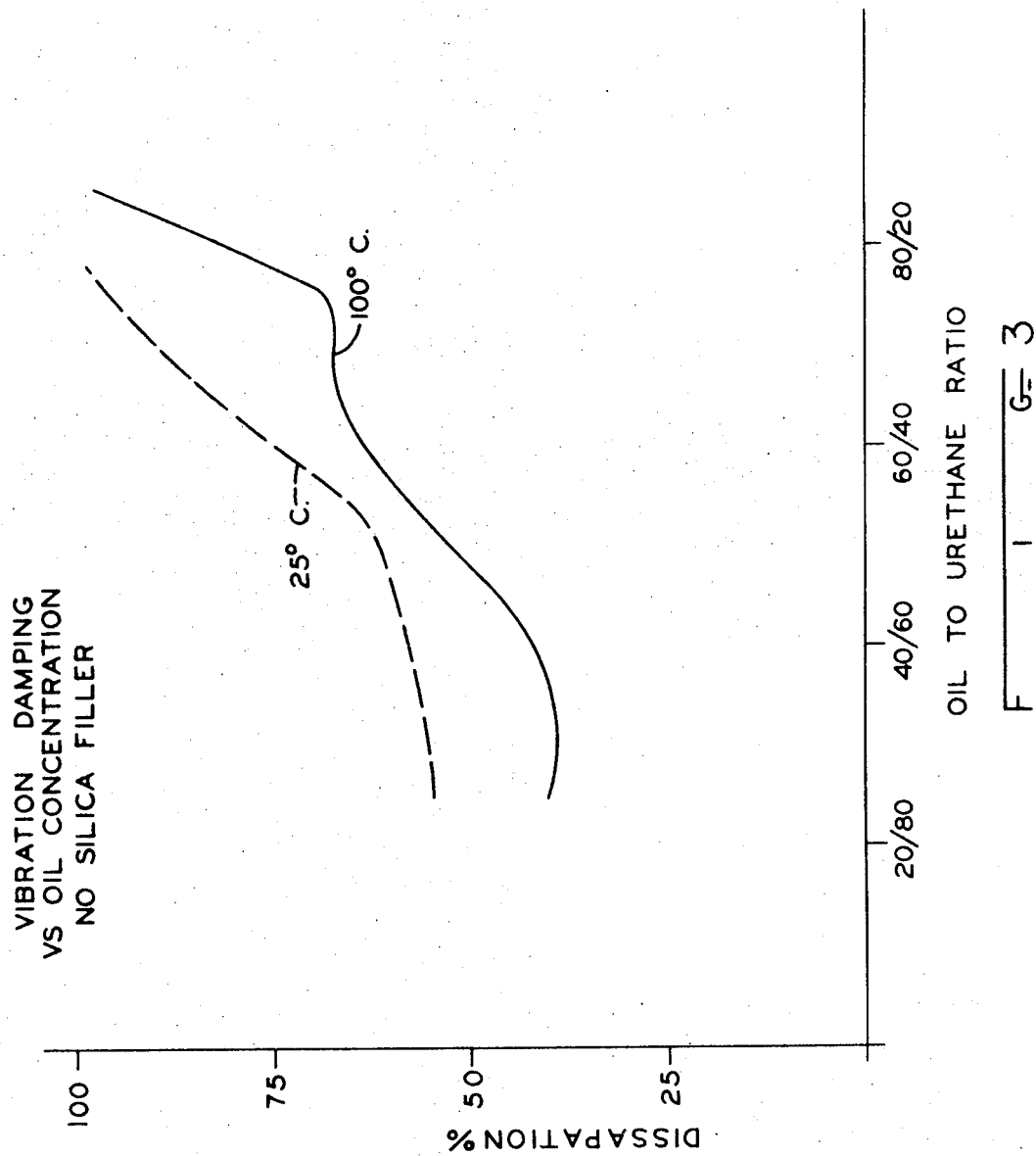

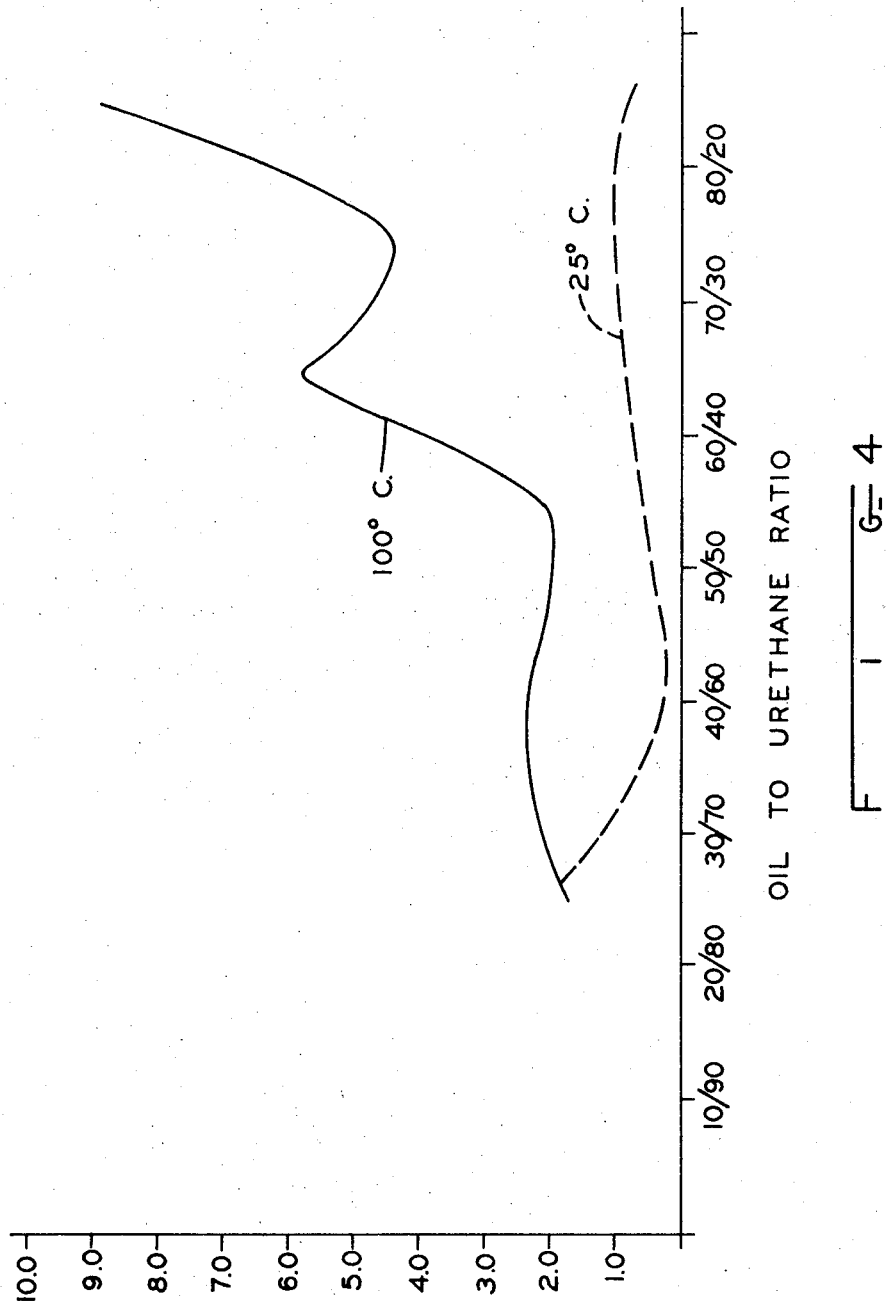

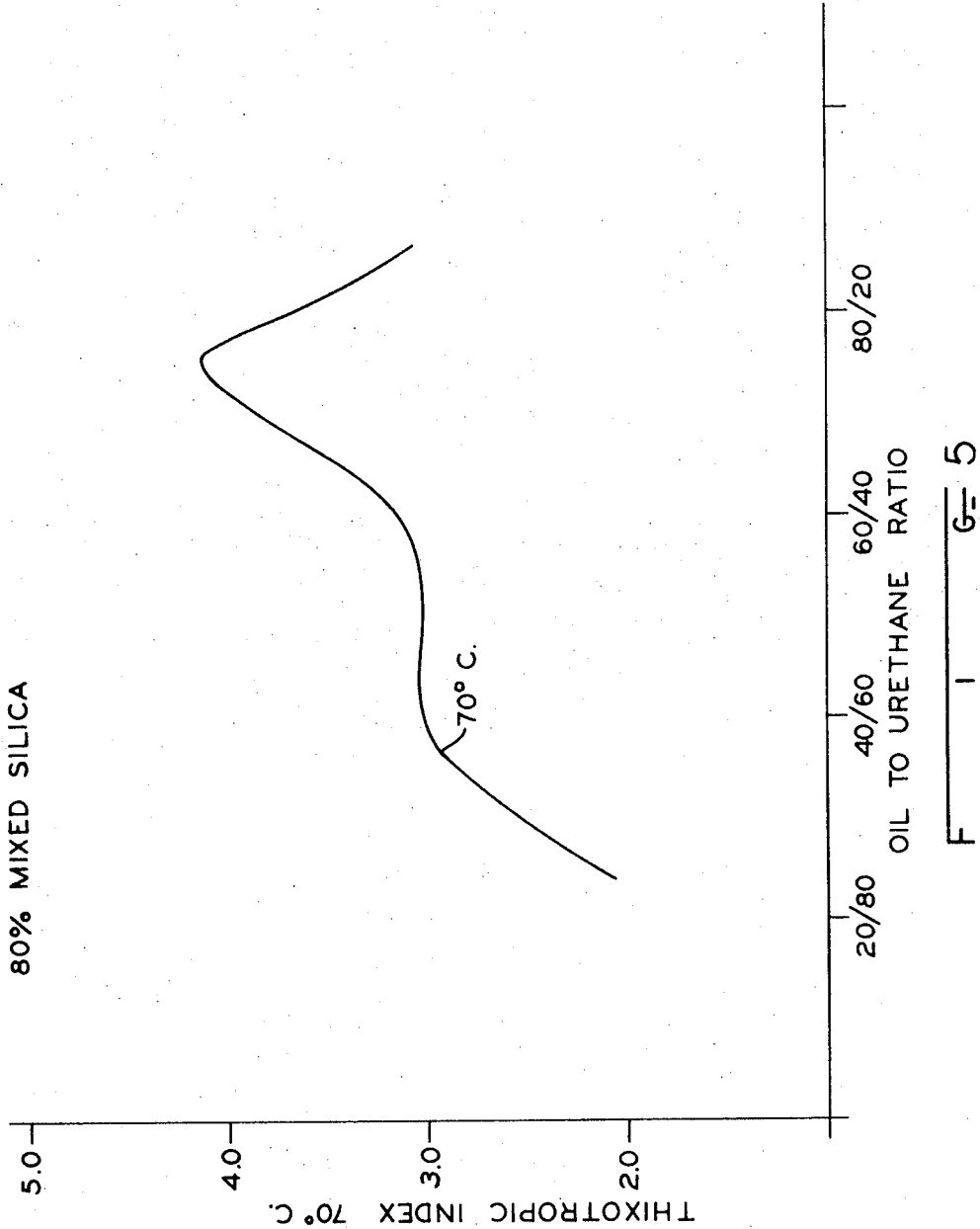

PETROLEUM BASED OIL MODIFIED CASTOR OIL-URETHANE COMPOSITION FOR ELECTRICAL POTTING

RELATED APPLICATIONS

This application is a continuation-in-part of copending application Ser. No. 77,678 filed Oct. 2, 1970 which in turn is a continuation-in-whole of application Ser. No. 697,180 filed Jan. 11, 1968, both now abandoned.

BACKGROUND OF THE INVENTION

Asphaltic materials have been accepted as potting compounds and are in most general use. While satisfactory in many applications, asphaltic materials have many limitations and are definitely deficient for many applications. A potting compound is used with a metal receptacle for encapsulating transformers, inductors, etc. and is frequently used with characteristically small sizes. The physical property requirements of a potting compound are diverse; while some essential properties can be compromised, a successful potting compound must embody at least minimal, and preferably the highest standard, in each of these distinct categories:

1. Thermal conductivity — the potting compound should have a high rate of heat transferability since it is to convey heat as rapidly and efficiently as possible away from the working components of the transformer or other electrical device encapsulated;

2. Water imperviousness — the potting compound should be relatively unaffected by water and should protect the components from water which has an adverse effect;

3. Hygroscopic effect — if the potting compound has a limited hygroscopic effect it will remove any water which may have been originally present and this is an ideal solution;

4. Mechanical damping — the material should have a high degree of mechanical vibration damping. This property is directly related to the ability of a potting compound to suppress the sound level which might accompany normal operation of the electrical device. The purpose here is to convert the sound of operation of the device into heat which in turn is dissipated by the potting compound;

5. Rheological properties — the material which is used as a potting compound should start out as low viscosity and should be pourable so as to completely fill the casing and totally encapsulate the electrical component. Almost immediately, the viscosity should increase so that the potting compound will not "run out" of openings before cure and should not exude from the metal receptacle;

6. Stability — once formed as a potting compound the material which protects the components should exhibit a high degree of inertness to atmosphere, humidity, temperature changes, so that the encased electrical components are adequately protected;

7. Cost — the potting compound must be reasonably priced both as a raw material and in its finished form. The present invention is based upon the idea of blending materials which are relatively expensive and relatively inexpensive and surprisingly, the synergistic combination yields the best properties of each;

8. Cure at room temperature — avoids ovens with resulting avoidance of pollution due to vapors and avoids need for caulking holes and seams;

9. Ease of repair — the potting material should be able to be removed by scraping and digging if repairs to the electrical components are required.

Upon consideration of these requirements it should now become apparent why it is that the art only rarely yields an improved potting compound and why it is that the asphaltic materials enjoyed such a high degree of acceptability over a long period of time. The persistency of the problem of how to obtain an improved potting compound is an indication of the unobvious nature of the present invention.

SUMMARY OF THE INVENTION

It is an object of the present invention to provide a new and improved potting compound which will supply certain of the deficiencies of the so-called asphaltic potting compound and, in particular, will combine improved inertness while permitting a higher level of noise suppression and dissipation of heat.

Another object of the present invention is to provide an improved potting compound which will nevertheless be sufficiently economical both as a starting compound and in method of application.

It is another object of the present invention to provide a potting compound which has a useful rheological nature whereby it is readily pourable and conformable with the receptacle containing the electrical component and will fully encapsulate such component while at the same time gaining in viscosity at reduced temperature to such degree that it will not "bleed" or "run out" of openings in the receptacle.

It is another object of the present invention to provide a highly heat resistant material which will not deteriorate with increasing temperature nor will it vary substantially in dimension with temperature and time. Also, since the material is thermosetting it will not flow from the case during electrical failure of the device.

A further object of the present invention is to provide a urethane type polymer which is extended in a unique manner by a petroleum oil and is blended prior to polymerization with silica material to combine the foregoing improved properties in a single material.

Other objects and features of the invention will become apparent from a consideration of the following detailed description which proceeds with reference to the accompanying drawings.

DRAWINGS

FIG. 2 is a graph showing vibration damping in which Dissipation percent is plotted versus the ratio of Petroleum Extending Material to urethane polymer used for a given potting compound having 80 percent by weight silica. The dash line curve values are obtained at 25°C. and the full line curve values are obtained at 100°C.;

FIG. 3 is the same composition and curve as FIG. 2 but illustrates the vibration damping in which the potting material used in FIG. 2 has omitted the silica compound. The dash line curve values are obtained at 25°C. and the full line curve values are obtained at 100°C;

Figure 1:
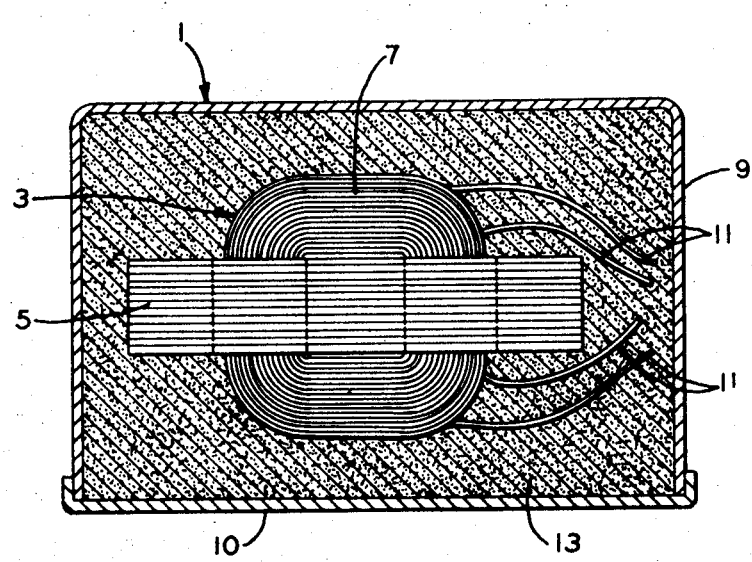
FIG. 1 is an enlarged sectional detail view of a ballast transformer for electrical and electronic equipment containing a potting material which is formulated in accordance with the present invention.

FIG. 4 is a curve illustrating vibration damping in which Critical Damping percent is plotted versus Petroleum Oil to urethane polymer ratio, with the full line curve values being obtained at 100°C. and the dash line curve values being obtained at 25°C.; and FIG. 5 is a graph in which the Thixotropic index is plotted versus Extender Oil to urethane polymer ratio, obtained with an 80 percent silica composition. The indicated values are obtained at 70°C.

GENERAL DESCRIPTION OF THE INVENTION

The urethane material used in the present invention is the reaction product of an isocyanate and a polyol which may be represented by the following general formula:

EQUATION I

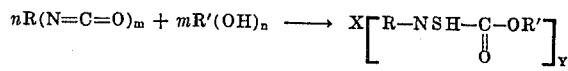

wherein:
R and R' are organic chains of aliphatic, aromatic and polar groups or radicals in which the sum of the equivalent weights of R and R' is greater than 500.
$(m + n)/2$ is greater than 2
X and Y are dependent on the degree of polymerization and crosslinking.

The above reactants denote a prepolymer and polyol, respectively. The prepolymer is prepared by the reaction of suitable polyfunctional isocyanates with a suitable polyhydric alcohol. Any organic polyisocyanate may be used which is known to form urethane prepolymers. Arylene diisocyanates of the benzene and naphthalene series or mixtures of these compounds are preferred. Examples of this type are the following:
Polymethylene polyphenyl isocyanate (PAPI)
diphenylmethyl diisocyanate (MDI)
Tolylene diisocyanate (2, 4/2,6) (TDI)
m-phenylene diisocyanate,
tolylene 2,4 diisocyanate
1-chlorophenylene 2,4 diisocyanate
diphenylether 4,4' diisocyanate
and diphenylmethane 4,4' diisocyanate.
Other aromatic diisocyanates as well as aliphatic polyisocyanates may be used but the latter are less reactive than the aromatic diisocyanates.

Suitable polyhydric alcohols to be used with the above diisocyanates in the preparation of the prepolymer are hydroxyl terminated polyesters, polyoxyalkylene polyols derived from polyhydric alcohols by the addition of an alkylene oxide or mixture of alkylene oxides to the polyhydric alcohol such as is obtained by the addition of propylene oxide to glycerine. Other polyhydric alcohols such as polyalkylene glycols, hydroxyl terminated polyesteramides and esters of polyhydric alcohols with an aliphatic acid of at least 12 carbon atoms and at least one hydroxy group per molecule. Examples of this type of hydroxy acid are ricinoleic acid, 12-hydroxy stearic acid hydroxy myristic acid and hydroxy cerotic acid. The length of the carbon chain is only limited by the fact that acids of greater than 22 carbon atoms are not commercially available. The polyhydric alcohols with which the above acids are esterified are illustrated by the following:
glycerol, pentaerythritol mannitol, sorbitol sucrose, trimethylolpropane and ethylene glycol. Castor oil which is essentially a trihydroxy ester and polymerized castor oils which have been modified by air blowing are particularly suitable polyhydric alcohols for use in this invention.

The polyol reactant in equation 1 may be of any of the said polyhydric alcohols suitable for making prepolymers. Again castor oil and its derivatives have been found to be particularly useful.

The degree of crosslinking in the polymer is determined by the functionality of the reactants in equation 1. The functionality of the prepolymer is given by the subscript $m$ and the functionality of the polyol is given by the subscript $n$. The average functionality must be greater than 2 as given by the function $(m+n)/2$.

Preferably the average functionality should be from 2.5 to 3.5. The prepolymers and polyols should be chosen to give an average equivalent weight between crosslinks of 500 or greater.

A method for producing the potting compound is to first mix the isocyanate prepolymer with the polyol which has been blended with a aromatic oil which serves as an extender. An important feature of the extending oil is that it has a certain critical degree of aromaticity and is present in a range of composition by weight of the isocyanate prepolymer. The aromaticity is conveniently measured in terms of the viscosity gravity constant. This value increases with the aromaticity of the oil. A means for computing the viscosity gravity constant (contracted as VGC) is as follows:

$$VGC = [G - 0.24\ 0.022\ LOG(V_1 - 35.5)\ ]/0.755$$

where $G$ equals specific gravity at 60°F. and $V_1$ equals Saybolt Universal Viscosity at 210°F. (See Mill et al., Industrial and Engineering Chemistry, Volume 20, Pate 641 (1928).

An important discovery of the present invention is that in order for the petroleum base oil to serve as an extender it must be fully compatible with the cured urethane polymer. If the viscosity gravity constant is not sufficiently high, compatibility will not be achieved hence neither will the objects of the present invention. By compatibility it is meant the ability of the prepolymer and polyol to accept the petroleum base oil and still form a polymeric compound which will gel but will not permit the loss of such extender oil from the final polymer by exudation.

By following the teaching of the present invention it is possible to blend together in a compatible manner a combination of polyisocyanate/castor oil and a petroleum base oil of the prescribed VGC, with the petroleum base oil ranging from 55 to 85 percent by weight of the mixture of urethane polymer and extender oil. It is by increasing the upper tolerable limit of the extender oil, beyond anything previously suggested by the prior art that I achieve important results of the present invention including improvements of the physical and functional properties of the potting compound while simultaneously lowering the cost of the potting material.

While adjustable within limits, it has been found that the petroleum base extender oil should have a viscosity gravity constant which is not substantially less than 0.95 to obtain a compatibility of 75 percent or greater.

Before the petroleum oil extended urethane prepolymer is polymerized it is blended with an amount of silica, of approximately 20–40 mesh, the mixture is then stirred until completely homogeneous. The oil extended urethane-silica mixture is then polymerized with about 75-90 percent by weight silica to provide the potting compound. When substantially less than 75 percent by weight silica is used in the potting material the heat conductivity values and thixotropy of the potting compound are substantially diminished and above about 90 percent the product lacks cohesiveness and exhibits the properties of wet sand.

Also, vibration damping properties of a potting compound are unacceptable when the per cent silica exceeds 90 percent by weight of the total composition.

URETHANE SYSTEM

The petroleum oil extended urethane is at least partially crosslinked with a suitable polyol such as castor oil and the combination of TDI and castor oil may be represented as:

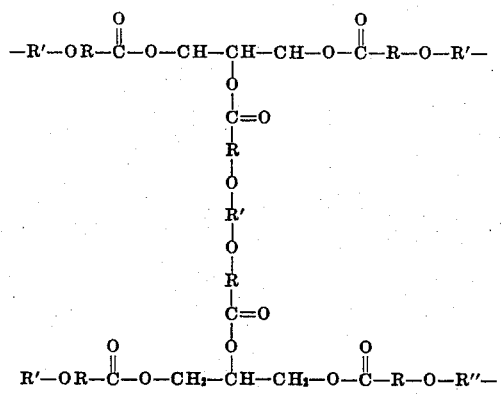

wherein:

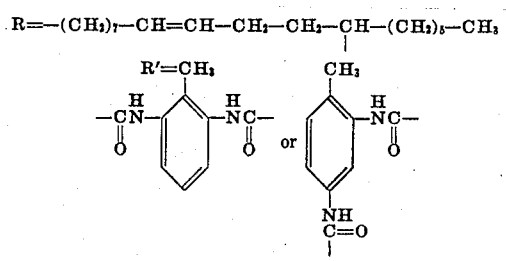

The urethane system is essentially the reaction product of a polyisocyanate with suitable hydroxy compounds such as castor oil, and polyoxyalkylene polyols, polyesters having hydroxyl groups. The polymer includes linear and crosslinked groups which are formed in the urethane reaction.

The crosslinkage occurs to an extent that the equivalent weight between crosslinks is not less than about 500 otherwise it is not possible to extend the product with oil without encountering exuding of the oil. For a useful class of cross-linkable polyurethane resins reference may be made to U.S. Pat. Nos. 2,879,250 and 2,879,248.

The preferred isocyanate is tolylene diisocyanate and the polyfunctional hydroxy compound is preferably castor oil. The urethane prepolymer is thereby formed by combining stoichiometric quantities of TDI and castor oil, the castor oil being added in distinct parts with one half the mole quantity being first added to the TDI accompanied by stirring and partial polymerization and the second mole half of the castor oil is thereafter added to the accompaniment of stirring.

POLYOL COMPOUND

The castor oil is an oil obtained from Baker Castor Oil Co. and is purchased under the trademark designation "DB" castor oil polyol and is identified as follows:
Hydroxyl Number — 164,
Molecular Weight — 925
Isocyanate equivalent weight — 346;
Acid No. — 0.6
Density — 0.980 grams per cc. at 25°C.;
Viscosity — 680 centipoise at 25°C.;
Viscosity — 65 centipoise at 60°C.; and
Functionality — 2.7.

TDI PREPOLYMER

The isocyanate prepolymer is prepared by the addition of excess toluene diisocyanate (80/20) type to a ricinoleate ester derived from castor oil and is known as "Vorite 128." It is obtained from Baker Castor Oil Company. The properties of this material are as follows:

| | |
|---|---|
| Color, Visual | Light Amber |
| NCO Content | 10.4–11.1 |
| Free TDI % | 7.5–9.0 |
| Equivalent Weight Per NCO Group | 378–404 |
| Specific Gravity at 25°C/25°C. | 1.072–1.080 |
| Viscosity at 25°C. (poise) | 180–270 |
| Refractive Index at 25°C. | 1.5215–1.5235 |

The urethane prepolymer and castor oil polyol are mixed together at room temperature and this is the base prepolymeric material used in the following examples. The two materials are blended together in the proportions by weight:
TDI isocyanate prepolymer —54%
DB castor oil polyol —46%

EXTENDER OIL

The isocyanate prepolymer-castor oil polyol mixtures are extended by an addition of 55 to 85 percent by weight of a petroleum oil having a high degree of aromaticity. What dictates the upper limit of petroleum oil is the ability of the urethane polymer to retain the oil without its exuding from the finished polymer. As much petroleum oil should be added as can be tolerated without exudation since it is the addition of the extender to the polymer oil which achieves the important functional and compositional improvement of properties of the potting material. That is, the greater the addition of oil the lower is the cost of the potting material, the greater its vibration damping properties, the greater its thixotropicity, the longer the pot life of the urethane, and the greater the ability to physically remove the potting material in the event that repairs are required of the encapsulated electrical component.

The lower limit is dictated by the fact that these improved properties do not evidence themselves until sufficient amounts of petroleum oil are added to the product and generally the benefits of the invention will not become significant until approximately 55 percent by weight of the polymer-oil combination is extender oil.

There are two factors which underline the discovery of the present invention: (1) extender oils are added far beyond what the prior art had previously thought possible to obtain and (2) those skilled in the art lacked any awareness that by exceeding the previous upper limits of petroleum oil additions it would be possible to improve the physical and functional properties of the potting compound. The extender oil additions follow a critical path as will be evident from a consideration of the accompanying graphs constituting FIGS. 2–5.

EXTENDER OIL PROPERTIES AND EFFECT

The extender oil has a high degree of aromaticity and its suitability as an extender is measured by the viscosity gravity constant (VGC) and is a function of the aromatic and naphthenic composition of the oil. As the number of aromatic or naphthenic rings increase the aromaticity of the oil increases and the higher will be the VGC number. It has been found that for best results the VGC number must be greater than 0.95.

Merely by way of example and not by limitation, it is suggested that those skilled in the art might use with good results two oils obtainable from Shell Oil Company and designated "Dutrex" 739 and "Dutrex" 998, both of these materials coming within the physical ranges previously specified. There is nothing critical in the composition or source of the oil as such, other than the physical parameters described, which is that the oil have sufficient aromaticity, established by the test of the VGC being greater than 0.95. The extender oils are generally obtainable by solvent extraction, or a distillation of heavy catalytic cycle oils, etc.

Other physical properties of the extender oil are:
Viscosity SSU/210°F 300–3000
boiling range 700°–1000°F at one atmosphere;
specific gravity 0.98–1.11 at 60°F.; and
refractive index 1.5–1.7 at 20°C.

For examples of the totally unexpected and beneficial effect of addition of petroleum oil extender to urethane polymer, reference is made to FIGS. 2–5.

A sample was made in accordance with the present invention utilizing four parts silica filler to one part urethane polymer-extender oil. The ratios of urethane to extender oil were then varied as indicated in FIG. 2. The formula used is as follows:

Example 1

Part A   Silica (200 mesh) 32 percent and (20–40 mesh) 48 percent
The urethane is comprised of:
Part B   TDI Prepolymer (Vorite 128) — 2.7 parts
  Castor Oil (DB polyl) 2.3 parts
The extender oil is:
Part C   Petroleum base oil 0.98 VGC (Shelldutrex Oil 957) varied from upper to lower limits.

Parts B and C are mixed together at room temperature and varied in ratio to each other in accordance with the graph values of FIGS. 2–5. To one part of the B and C components is added four parts of A and the mixture then polymerized at 25°C. The Percent Dissipation versus the Change in Oil Concentration values obtained at 25°C. and 100°C. were then obtained. From the graph it can be seen that increasing the ratio of extender oil to urethane from 55/45 to 85/15 has the effect of substantially increasing the per cent dissipation which indicates the efficiency of vibration damping of the potting material. In a potting compound, it is important to achieve vibration damping because vibration damping properties indicate the convertibility of the material of sound energy to heat energy and thereby to suppress sound produced by electrical components. The higher the per cent of mechanical loss, the more efficient the potting material in converting sound energy to heat. Consequently, by measuring the mechanical damping properties of the potting material it is possible to obtain a correlation to the sound suppressing qualities.

A ball was dropped on a pad of the material from a predetermined height and the height of rebound was measured. The difference between the original height and the height of rebound measures the energy loss due to the conversion of mechanical energy to heat. In these experiments the ball was made of an elastomer, weighed $1.1 \times 912$ oz., had a diameter of 1.088 inches and rebounded to 96.5 percent of the original height when dropped on a steel plate. The pads were 1 inch thick and 4½ inches in diameter. Experiments were conducted at 25°C. and 100°C. In the experiments conducted at 100°C., the pads were heated in an oven before dropping the ball, but the ball was not heated. Data obtained are shown in FIG. 2. In these figures the percentage of the kinetic energy of the ball which was dissipated in the pad was calculated from the following equation:

$$\% \text{ dissipation} = (hl_1 - l_2)/l_1$$

where
$l_1$ = original height of ball
$l_2$ = height of rebound
$h$ = efficiency of the ball (0.965)

As can be seen in the curve obtained, it is distinctly non-linear and shows a surprising totally unexpected dissipation of energy at an oil to urethane ratio above 55/45. The test was performed on the same sample of material but without silica filler as indicated in FIG. 3 and again it was determined that the mechanical dissipation was non-linear. The per cent damping increases with non-silica filled materials starting from about 40/60 by weight of extender oil to urethane and increasing substantially by further additions of petroleum extender oil up to 85/15 ratio of the extender oil to urethane.

Referring next to FIG. 4 a sample of the same material as used in FIG. 2 was tested for vibration damping in accordance with Mil-P-32581A (Ships) for 2,000 HZ test plates. The experiments were conducted at 25°C. and 100°C. respectively with the test plates suspended in an oven. The results are substantiated to be non-linear and the damping increases disproportionately, above 55/45 ratio of the extender oil to the resin component. The significance of vibration damping at 100°C. with increasing percent concentrations of extender oil is of special significance for a fluorescent lamp ballast which operates at 105°C. since mechanical energy dissipation will have a significant effect upon decreasing the sound radiated by the electrical component.

Referring to FIG. 5, the same material as provided in obtaining the curves of FIGS. 2,4 is used in determining the Thixotropic Index vs. Oil to urethane ratio, these values being obtained at 70°C. before polymerization. The thixotropic index is defined as the ratio of the viscosity measured at 5 RPM to the viscosity at 100 RPM with a Brookfield viscosimeter. The thixotropic index is an important factor in preventing the exudation of resin from a transformer case by flow from the lead holes and seams prior to gellation of the urethane polymer. In order to prevent such leakage, the index should be greater than about 3.0. As indicated in FIG. 5, a thixotropic index of 4.2, well above the 3.0 scale, is obtainable with oil to urethane ratios in excess of about 40/60 by weight of the non-silica materials. As indicated, addition of petroleum oil, increases the thixotropic index up to about 75/25 ratio by weight of oil to urethane components.

SILICA ADDITION

As noted previously, optimizing the potting compound is obtained not only by close regulation of the amount of extender oil but also the per cent of silica in the overall composition. The addition of the silica improves the heat dissipation qualities of the potting compound. As silica is added, the potting compound will more readily conduct heat away from the embedded electrical component in such manner as to permit it to operate and function in an efficient manner. It has been found that if the silica is below about 75 percent by weight of the potting compound the thixotropic value and heat conductivity of the potting compound are too low and above 90 percent by weight of the silica, there is insufficient resin to serve as a binder. The thermal conductivity of a ballast produced in accordance with the present invention is $10 \times 10^{-4}$ cal/(sec) (cm.) (°C). This is to be compared with a silica filled asphaltic material which has a thermal conductivity of $7 \times 10^{-4}$ cal/(sec) (cm.) (°C). The silica also has an important contribution in noise suppression. In a direct comparison, sound suppression with and without the silica content, the following two materials were tested:

|  | % by wt. |
|---|---|
| isocyanate prepolymer (Vorite 128) | 2.7% |
| castor oil polyol (DB Oil) | 2.3% |
| petroleum oil extender (Dutrex 739) | 6.0% |
| petroleum oil extender (Dutrex 998) | 9.0% |
| silica (200 mesh) | 80.0% |
| Total | 100.0% |

A second example was then made of the same material but without the silica and fluorescent lamp ballasts potted with these were tested under normal operating temperatures in an anechoic chamber. The silica containing material produced a sound value of 7.5 db, and the second example which differed from the first only by omission of silica, has a sound level of 12.5 db which is an increase in power sound level of over 100 percent.

Moreover, comparing the thixotropic characteristics of the two materials, the non-silica containing material required sealing of the seams and lead holes of the ballast case to prevent leakage of the resin before cure whereas the fluorescent ballast of the same material which contained silica had no requirement for sealing of the seams and lead holes. It must be seen that a silica-urethane potting compound is superior to a non-silica containing material both with respect both to the thixotropic nature and sound suppression.

The size of the silica is usually a blend of 200 mesh and 20–40 mesh which is preheated at 70°C. before adding to the resin.

COMPATIBILITY OF PETROLEUM BASED OIL

The relative degree of compatibility of the extending oils can be measured by the concentration of extending oil which can be retained by the cured urethane polymer without exudation. The last column of the following chart shows this compatibility for a series of petroleum oils designated by grade number. The relative concentration are expressed as percentages of oil in the extender oil urethane mixtures. The urethane component was a mixture of VORITE 128 and DB Castor Oil in stoichiometric concentrations.

| Dutrex oil grade number | Viscosity, SUS 210° F. | Volatility, percent loss [1] | Aniline point, °F. | Viscosity gravity constant | Paraffinic carbon atoms, percent [2] | Compatibility, percent |
|---|---|---|---|---|---|---|
| 275 | 35 | 7.9 | 89.5 | 0.939 | 27 | 50 |
| 298 | 40 | 6.5 | 22.5 | 0.967 | 27 | [3] 75 |
| 315 | 44 | 0.8 | 108 | 0.920 | 38 | 50 |
| 357 | 47 | 0.6 | 55 | 0.961 | 42 | 85 |
| 419 | 49 | 4.6 | 12 | 0.986 | 26 | 85 |
| 739 | 107 | 0.4 | 13 | 0.999 | ([4]) | 85 |
| 757 | 124 | 0.1 | 83 | 0.943 | 43 | [5] 50 |
| 898 | 271 | 0.4 | | ([6]) | | [3] 75 |
| 959 | 438 | 0.1 | | 1.006 | ([4]) | [3] 75 |
| 985 | 783 | 0.1 | 131 | 0.912 | 45 | 50 |
| 998 | 2,443 | 0.1 | | 0.974 | | [3] 75 |
| 1726 | 85 | 0.2 | 105 | 0.931 | 38 | 50 |
| 1786 | 145 | 0.1 | 90 | 0.948 | 39 | 50 |
| 957 | 478 | 0.02 | 97 | 0.980 | 30 | 85 |

[1] Percent loss after 22 hrs. at 225° F.
[2] Method of S.S. Hurtz, et al. Anat. Chem 28, 1928 (1956).
[3] Value represents highest concentration tested. Maximum value may be greater.
[4] Aromatic content too high for measurement.
[5] Oil extruded after one week.
[6] Method not suitable for oil containing asphaltanes or oil too dark for refractive index.

MOISTURE PROOFING PROPERTIES

One of the properties of the potting material is that certain of the free isocyanate groups will react with moisture, and by scavanging this moisture before gellation, the electrical components potted are rendered virtually 100 percent free from water and therefore will operate more efficiently and durably. If substantial amounts of moisture are to be removed by this reaction, additional prepolymer must be included above that needed to react with the polyol. Usually a 10 percent excess is sufficient. It has further been found that the potting compound is superior to asphalt filled ballast in respect to water permeability and water penetration. In comparing two groups of asphaltic and urethane-filled ballast transformers the average urethane filled ballast will last 551 cycles in rain test before failure as compared with only 76 cycles of the average asphalt filled ballast before failure. In this rain test, the ballasts are alternately energized and deenergized in a programmed cycle of water spray. In a 7 day immersion test water permeability of asphalt was 0.004 as compared to 0.006 for urethane potting compounds which is adequate. In moisture absorbtion using a 90 percent RH test for 7 days the asphalt potting compound had a 0.05 percent weight gain as compared to 0.06 percent weight gain for the urethane.

ADDITIONAL EXAMPLE EMBODIMENTS OF THE INVENTION

Example 2

| | | % |
|---|---|---|
| prepolymer | (Vorite 128) | 2.7 |
| polyol | (DB Oil) | 2.3 |
| petroleum oil | (Dutrex 739) | 6.0 |
| petroleum oil | (Dutrex 998) | 9.0 |
| | Silica 20–40 mesh (20–40 Wedron) | 48.0 |
| | Silica 200 mesh (Oregon "800") | 32.0 |

PROPERTIES

Gel time at 25°C. — 16 hr.
Gel time at 70°C. —185 min.
Viscosity at 70°C.
(Brookfield Spindle No. 6)
5 RPM — 38,400 cps.
100 RPM — 6,600 cps.
Viscosity at 25°C. — Putty like

Example 3

| | | % |
|---|---|---|
| prepolymer | (Vorite 128) | 2.7 |
| polyol | (DB Oil) | 2.3 |
| petroleum extender | (Dutrex 739) | 9.0 |
| petroleum extender | (Dutrex 998) | 6.0 |
| | Silica, 100–200 Mesh (Oregon "800") | 80.0 |

PROPERTIES

Gel time at 25°C. — 16 hr.
Gel time at 70°C. — 185 min.
Viscosity at 70°C.
(Brookfield Spindle No. 6)
5 RPM — 160,000 cps.
100 RPM — 9,600 cps.
Viscosity at 25°C. — Putty like Example 3, because of its extremely high viscosity, necessitated vibrating the ballast case in order to effect proper filling thereof.

In these embodiments, as in the previous embodiment, there is no sealing required of the lead holes of the ballast transformer case during the resin cure. In these examples, as well as in numerous other examples which will suggest themselves to those skilled in the art, it is recommended that the VGC be not less than 0.95 and that the pouring characteristics while changeable will have a viscosity of not less than 500 CPS at 70°C. and greater than 50,000 CPS at 25°C. Within this range, a substantial variety and mixture of blends can be provided. These different materials are prepared by first mixing the petroleum oil with the castor oil polyol. The isocyanate prepolymer is then added and the materials are maintained at about 70°C. After the polyol and the isocyanate prepolymer are adjusted to be in substantially stoichiometric amounts, the combination of petroleum oil and isocyanate prepolymer and castor oil are stirred until homogeneous. The liquid material at this point is of low viscosity and is combined with preheated silica. The mixture is then poured into a cold ballast case containing a transformer and other components. The viscosity increases rapidly as the temperature drops. The viscosity reaches a value of over 50,000 centipoise when cooled to 25°C. so that none of the compound will be sufficiently fluid to permit leakage from the ballast case. A fluorescent lamp ballast containing electrical components was prepared using the material of Example 1 poured at temperature of 70°C. and the completed ballast after standing overnight at 25°C. had completed gellation of the urethane polymer. No leakage occurred at the lead holes or seams and all water or moisture which may have been in proximity to the encased electrical device was completely scavanged.

SPECIFIC BALLAST

One suitable example of potting is that indicated in FIG. 1 wherein a ballast 1 suitable for use with electrical and electronic equipment is provided including a transformer 3 comprising a core 5 and a coil 7. Core 5 and the coil 7 are disposed within an outer ballast case 9 and spaced therefrom by means of the potting compound of the present invention. The ballast case 9 comprises a retaining box of sheet metal. The box is usually provided with a cover 10 which may be removed to gain access. As previously mentioned one of the important features of the present invention is that the potting material can be readily removed by prying it out mechanically with a screw driver or other tool when it is desired to gain access to the potted electrical components for repair thereof.

The potting compound is adapted for dissipating heat generated by the coil 7. Furthermore, the potting compound serves to suppress noise generated by the vibrating components within the ballast case. The core 5 is of suitable potting material and is formed from stacked laminations in a manner well known in the art. Coil 7 comprises a plurality of layers of wire or foil which are wound over each other and are insulated from one another by suitable insulation in a conventional manner.

Generally the core 5 and coil 7 and insulating material are impregnated with a varnish or suitable resin. Electrical leads or taps 11 are generally taken from the coil 7 and leave one end of the ballast 1 where they ordinarily pass out through lead holes in the case 9.

While the present invention has been illustrated and described in connection with a few selected example embodiments it will be understood that those skilled in the art can make numerous revisions and adaptations of the invention and it is intended that such revisions and adaptations will be included within the scope of the following claims as equivalents of the invention.

What is claimed is:

1. An electrical potting compound consisting of the product of reaction of:

A. An isocyanate terminated prepolymer produced by reaction of a stoichiometric excess of an arylene polyisocyanate with a castor oil based polyol;
B. Castor oil;
C. 55-85 percent by weight, based on the total of A and B, of a petroleum based oil having a viscosity gravity constant greater than 0.95 and a viscosity in SSU at 210°F of 300-3,000; and
D. 75-90 percent, by weight, based upon the total composition, of a silica filler having a size of 20 to 200 mesh; to provide a potting compound having a thixotropic index greater than 3.0, when measured at 70°C, after mixing, but before substantial polymerization has occurred.

2. The potting compound in accordance with claim 1 wherein the petroleum oil is characterized by a high degree of aromaticity and a boiling range of 70° – 1,000°F.

3. The electrical potting compound in accordance with claim 1 wherein the pouring characteristic will have viscosity of not less than 500 CPS at 70°C and greater than 50,000 CPS at 25°C.

4. A ballast containing the electrical potting compound of claim 1.

* * * * *